(12) United States Patent
Song et al.

(10) Patent No.: US 9,857,181 B2
(45) Date of Patent: Jan. 2, 2018

(54) METHODS AND APPARATUS FOR EVALUATING OPERATION OF A VEHICLE ONBOARD NAVIGATION SYSTEM USING LATERAL OFFSET DATA

(71) Applicant: GM GLOBAL TECHNOLOGY OPERATIONS LLC, Detroit, MI (US)

(72) Inventors: Xiaofeng Frank Song, Novi, MI (US); Xian Zhang, Wixom, MI (US); Dmitriy Feldman, West Bloomfield, MI (US); Paul A. Adam, Milford, MI (US)

(73) Assignee: GM GLOBAL TECHNOLOGY OPERATIONS LLC., Detroit, MI (US)

( * ) Notice: Subject to any disclaimer, the term of this patent is extended or adjusted under 35 U.S.C. 154(b) by 28 days.

(21) Appl. No.: 14/823,693

(22) Filed: Aug. 11, 2015

(65) Prior Publication Data

US 2017/0045362 A1    Feb. 16, 2017

(51) Int. Cl.
| | |
|---|---|
| *G01C 21/30* | (2006.01) |
| *G01S 19/48* | (2010.01) |
| *G01S 19/45* | (2010.01) |
| *G06K 9/00* | (2006.01) |
| *G08G 1/16* | (2006.01) |

(52) U.S. Cl.
CPC ............ *G01C 21/30* (2013.01); *G01S 19/45* (2013.01); *G01S 19/48* (2013.01); *G06K 9/00798* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 8,700,324 | B2* | 4/2014 | Halder | G01C 21/165 |
| | | | | 701/408 |
| 8,996,197 | B2* | 3/2015 | Joh | G01C 21/30 |
| | | | | 701/1 |
| 9,052,207 | B2* | 6/2015 | Miksa | G01C 21/30 |
| 9,109,907 | B2* | 8/2015 | Park, II | G01C 21/30 |
| 9,435,653 | B2* | 9/2016 | Zeng | B60W 30/0956 |
| 9,529,092 | B2* | 12/2016 | Friend | G01S 19/49 |
| 2011/0118979 | A1 | 5/2011 | Mao et al. | |

(Continued)

OTHER PUBLICATIONS

Song, Xiaofeng F., U.S. Appl. No. 14/849,726 entitled "Methods and Apparatus for Performance Assessment of a Vehicle Onboard Navigation System Using Adaptive Stochastic Filtering," filed Sep. 10, 2015.

(Continued)

*Primary Examiner* — Redhwan K Mawari
*Assistant Examiner* — Edward Torchinsky
(74) *Attorney, Agent, or Firm* — Lorenz & Kopf, LLP (57) ABSTRACT

A method for assessing operation of a navigation system onboard a vehicle is provided. The method determines a sensor-based lateral offset change using vehicle onboard sensor data; determines a second lateral offset change using navigation system data; computes a difference between the sensor-based lateral offset change and the second lateral offset change; performs secondary calculations using the difference to produce a result; and when the result is greater than a threshold error value, provides an error notification.

18 Claims, 5 Drawing Sheets

(56) References Cited

U.S. PATENT DOCUMENTS

| | | |
|---|---|---|
| 2012/0053831 A1 | 3/2012 | Halder |
| 2012/0109517 A1 | 5/2012 | Watanabe |
| 2013/0162824 A1* | 6/2013 | Sung .................. G01C 21/3602 |
| | | 348/148 |
| 2014/0379254 A1* | 12/2014 | Miksa .................... G01C 21/32 |
| | | 701/450 |
| 2016/0282128 A1* | 9/2016 | Zeng ................. B60W 30/0956 |
| 2016/0358477 A1 | 12/2016 | Ansari |
| 2016/0377437 A1* | 12/2016 | Brannstrom ......... G01C 21/165 |
| | | 701/501 |

OTHER PUBLICATIONS

USPTO, Office Action in U.S. Appl. No. 14/849,726 dated Feb. 7, 2017.
USPTO, Final Office Action in U.S. Appl. No. 14/849,726 dated Jul. 14, 2017.

* cited by examiner

METHODS AND APPARATUS FOR EVALUATING OPERATION OF A VEHICLE ONBOARD NAVIGATION SYSTEM USING LATERAL OFFSET DATA

TECHNICAL FIELD

Embodiments of the subject matter described herein relate generally to evaluating the performance of a vehicle onboard navigation system. More particularly, embodiments of the subject matter relate to using lateral vehicle offset values to determine accuracy of navigation system output.

BACKGROUND

Vehicle navigation systems, including global positioning systems (GPS), are commonly used by drivers to obtain current location information, map data, and detailed, turn-by-turn directions to get from a current location to a destination location. However, a typical navigation system only maintains accuracy of up to 2-3 meters (approximately 6.6-9.8 feet). The actual accuracy users attain depends on multiple factors, including, but not limited to, atmospheric effects, sky blockage, and receiver quality. Real-world data from the Federal Aviation Administration (FAA) show that their high-quality GPS SPS receivers provide better than 3.5 meter horizontal accuracy.

Specific applications, such as autonomous vehicle operation, may require increased accuracy for a navigation system, rendering an error of 2 meters (or more) impractical. Further, dependence upon a potentially flawed navigation system (by an autonomous driving application or an in-person driver) may present unforeseen consequences (e.g., a user following flawed directions presented by the navigation system).

Accordingly, it is desirable to use a mechanism for determining whether a navigation system is providing accurate output. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for assessing operation of a navigation system onboard a vehicle. The method determines a sensor-based lateral offset change using vehicle onboard sensor data; determines a second lateral offset change using navigation system data; computes a difference between the sensor-based lateral offset change and the second lateral offset change; performs secondary calculations using the difference to produce a result; and when the result is greater than a threshold error value, provides an error notification.

Some embodiments provide a system for assessing operation of a navigation system onboard a vehicle. The system includes: system memory; a navigation system, configured to detect a plurality of vehicle positions; at least one vehicle sensor, configured to obtain first lateral offset data associating the vehicle to a lane marker; and at least one processor, communicatively coupled to the system memory, the navigation system, and the at least one vehicle sensor, the at least one processor configured to execute processing logic configured to: compute second lateral offset data based on the plurality of vehicle positions detected by the navigation system; calculate a difference between the first lateral offset data and the second lateral offset data; and determine whether the navigation system is operating within allowable error limits, based on the difference.

Some embodiments provide a non-transitory, computer-readable medium containing instructions thereon, which, when executed by a processor, perform a method. The method calculates a difference between a first lateral vehicle offset to a second lateral vehicle offset, wherein the first lateral vehicle offset is provided by a vehicle sensor, and wherein the second lateral vehicle offset is based on data obtained from a navigation system onboard a vehicle; and determines whether the navigation system is functioning within a predefined error bound, based on the difference.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods used to evaluate the performance of a navigation system onboard a vehicle without the aid of a known "ground truth" value. As described below in the context of the present disclosure, navigation system performance is assessed by comparing lateral offset values obtained using onboard vehicle sensors with lateral offset values obtained using the navigation system and local map data.

Certain terminologies are used with regard to the various embodiments of the present disclosure. The "ground truth" is defined as the actual, physical location of a vehicle at a given time. A lateral offset is a distance from the vehicle to a designated landmark, and a lateral offset change is the difference between distances obtained at different times. A landmark is any visible, physical feature located outside the vehicle for which detail is included in a map database accessible to the vehicle. The allowable error for a navigation system is the highest threshold of difference between vehicle sensor-based lateral offset and lateral offset values determined using navigation system data and local map data.

Figure 1:
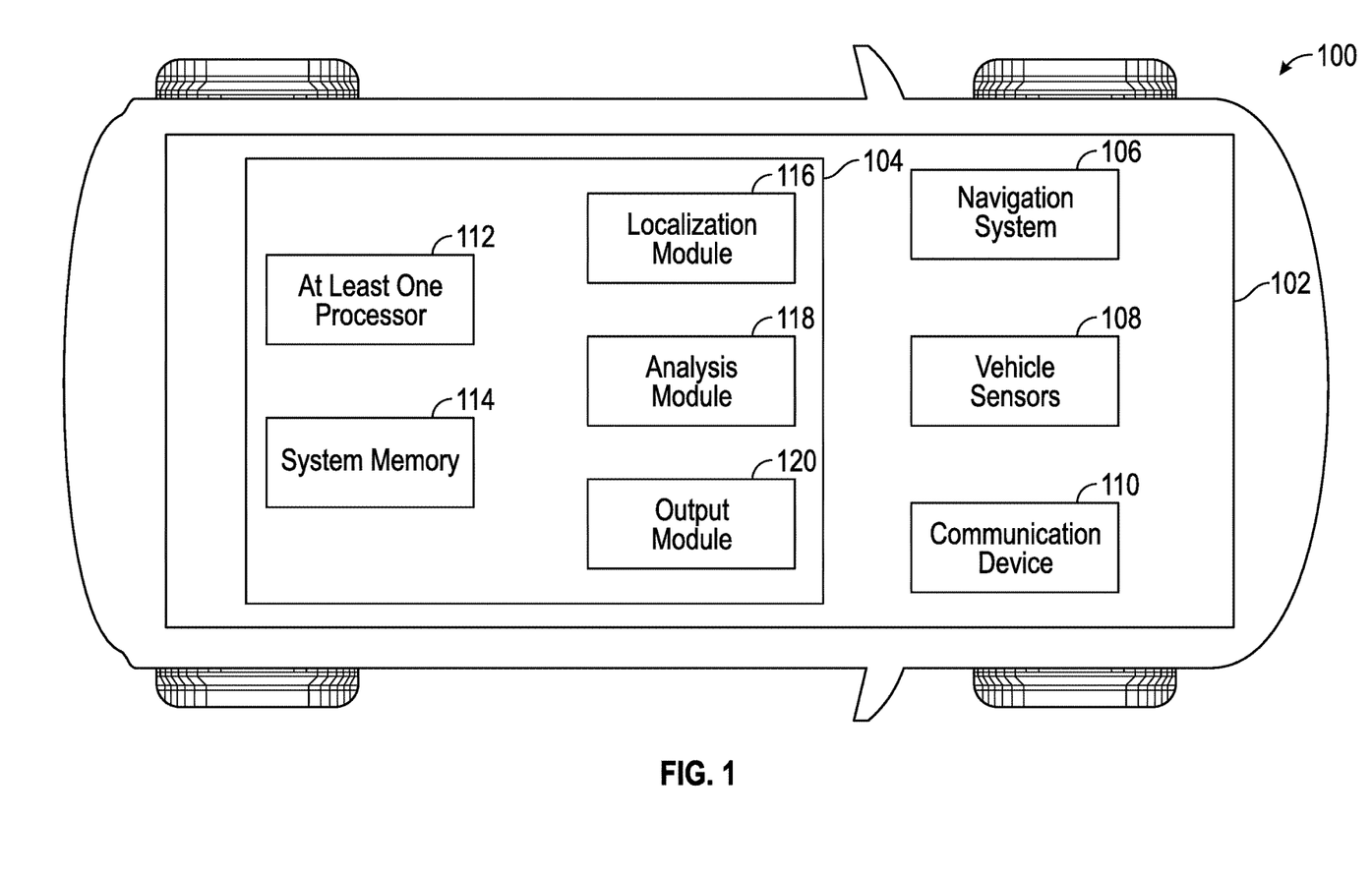
FIG. 1 is a functional block diagram of an evaluation system for a navigation system onboard a vehicle, in accordance with the disclosed embodiments.

Turning now to the figures, FIG. 1 is a functional block diagram of an evaluation system 102 for a navigation system onboard a vehicle 100, in accordance with the disclosed embodiments. The evaluation system 102 generally includes, without limitation: a navigation system 106; vehicle sensors 108; a communication device 110; and at least one vehicle electronic control unit (ECU) 104. These elements and features of evaluation system 102 may be operatively associated with one another, coupled to one another, or otherwise configured to cooperate with one another as needed to support the desired functionality—in particular, monitoring the accuracy of a navigation system for a vehicle 100, as described herein. For ease of illustration and clarity, the various physical, electrical, and logical couplings and interconnections for these elements and features are not depicted in FIG. 1. Moreover, it should be appreciated that embodiments of the evaluation system 102 will include other elements, modules, and features that cooperate to support the desired functionality. For simplicity, FIG. 1 only depicts certain elements that relate to the performance assessment techniques described in more detail below.

The navigation system 106 is deployed onboard the host vehicle 100. In practice, the navigation system 106 may be implemented as part of an onboard vehicle entertainment system, an onboard display system, an onboard vehicle instrumentation cluster, or the like. In one practical embodiment, the navigation system 106 is realized as, includes, or cooperates with an onboard global positioning system (GPS) that derives the current geographic position of the vehicle in real-time or substantially real-time. The navigation system 106 is configured to provide navigation data to a driver of the vehicle 100. Navigation data may include location data for the vehicle 100, turn-by-turn driving directions, and visual map information to the vehicle operator. When the vehicle 100 is being driven, the navigation system 106 functions to periodically detect and/or measure a current location for the vehicle 100. The navigation system 106 may present this location data to a driver of the vehicle 100 via a display element or other presentation device. A current location for the vehicle 100 may be a triangulated position, a latitude/longitude position, x and y coordinates, or any other notation indicative of the geographic position of the vehicle 100.

The vehicle sensors 108 are configured to detect a landmark outside the vehicle 100 and within operating range of the vehicle sensors 108. A landmark may be anything within detection distance of the sensor which is also associated with map data stored in a database accessible to the vehicle. Examples of landmarks may include, road-based features, such as: lane markers (e.g., stripes or dashed lines painted on the road surface, reflectors on the road surface, etc.), road signs, barricades, railing, or the like. Landmarks may also include land-based features, such as: a tree, a mountain, a building, or the like.

The vehicle sensors 108 are further configured to identify a distance between the vehicle sensors 108 to the detected landmark, or in other words, to identify a sensor-based lateral offset from the vehicle 100 to the landmark. The vehicle sensors 108 may be implemented using a camera system, lidar sensors, radar sensors, or any other vehicle-based sensor capable of determining a distance from the vehicle 100 to a landmark. Each of the vehicle sensors 108 is positioned to perform these operations outside of the vehicle 100, and is capable of transmitting lateral offset data to the vehicle ECU 104 for further processing.

The communication device 110 is suitably configured to access a map database that is remotely stored (e.g., stored at a remote server that is not onboard the vehicle). The communication device 110 is configured to obtain map data from an appropriate source that provides data indicative of current cartographic, topological, location, road, and possibly other data useful to the evaluation system 102. As described in more detail below, data received by the communication device 110 (from outside the evaluation system 102) may include, without limitation: data associated with a map database, navigation data, and other data compatible with the evaluation system 102. Data transmitted by the communication device 110 (to a destination outside the evaluation system 102) may include, without limitation, requests for map data associated with a current vehicle location, and the like. In the context of the evaluation system, the communication device 110 is configured to transmit and receive any data that is appropriate or necessary for real-time evaluation of the navigation system 106 operations.

In certain embodiments, the communication device 110 utilizes a wireless local area network (WLAN) connection, a cellular telecommunication network, and/or a short-range wireless communication protocol to establish a connection with a remote server from which software data is downloaded. In some embodiments, the communication device 110 is implemented as an onboard vehicle communication or telematics system, such as an OnStar® module commercially marketed and sold by the OnStar® corporation, which is a subsidiary of the assignee of the instant Application, the General Motors Company, currently headquartered in Detroit, Mich. In embodiments wherein the communication device 110 is an OnStar® module, an internal transceiver may be capable of providing bi-directional mobile phone voice and data communication, implemented as Code Division Multiple Access (CDMA). In some embodiments, other 3G technologies may be used to implement the communication device 110, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, and the like. In some embodiments, 4G and/or 5G technologies may be used to implement the communication device 110, alone or in combination with 3G technologies, including without limitation: Evolved High Speed Packet Access (HSPA+), Long Term Evolution (LTE) and/or Long Term Evolution-Advanced (LTE-A).

The vehicle electronic control unit (ECU) 104 may be implemented as a single ECU or multiple ECUs onboard the vehicle 100, which are configured to communicate with the navigation system 106, vehicle sensors 108, and the communication device 110. The vehicle ECU 104 may include at least one processor; system memory 114; a localization module 116; an analysis module 118; and an output module 120. The at least one processor 112 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 112 may be realized as one or more microprocessors, controllers, microcontrollers, or state machines. Moreover, the at least one processor 112 may be implemented as a combination of computing devices, e.g., a combination of digital signal processors and microprocessors, a plurality of microprocessors, one or more microprocessors in conjunction with a digital signal processor core, or any other such configuration.

The system memory 114 may be realized using any number of devices, components, or modules, as appropriate to the embodiment. In practice, the system memory 114 could be realized as RAM memory, flash memory, EPROM memory, EEPROM memory, registers, a hard disk, a removable disk, or any other form of storage medium known in the art. In certain embodiments, the system memory 114 includes a hard disk, which may also be used to support functions of the at least one processor 112. The system memory 114 can be coupled to the at least one processor 112 such that the at least one processor 112 can read information from, and write information to, the system memory 114. In the alternative, the system memory 114 may be integral to the at least one processor 112. As an example, the at least one processor 112 and the system memory 114 may reside in a suitably designed application-specific integrated circuit (ASIC).

In certain embodiments, system memory 114 is configured to locally store a map database or map data for further use of the evaluation system 102. The map data can represent locally stored, cached, downloaded, or otherwise accessible information, which can be processed by the at least one processor 112 of the vehicle ECU 104. For example, in a fully onboard implementation, the map data source(s) may be realized as one or more hard disks, semiconductor memory devices, portable storage media, or the like. In an alternate embodiment, the map data source(s) may be realized as an onboard memory cache that temporarily stores the map data that is downloaded by the communication device 110 from one or more remote servers and/or databases.

The localization module 116 is configured to use map data to "localize" the vehicle 100, or in other words, to associate the vehicle 100 to the current location which is a defined location in the map database. The current location of the vehicle is termed "defined" due to the availability of map data associated with the location, which is stored in a map database accessible to the vehicle 100. Localization may include associating a current GPS location to available map data, associating an identified landmark to available map data, or associating any other known aspect of the current location of the vehicle 100 with available map data. As described previously, the map database may be accessed and/or downloaded via the communication device 110, and may be stored locally in system memory 114.

The analysis module 118 is configured to use the lateral offset data from the vehicle sensors 108, the vehicle navigation data provided by the navigation system 106, and the applicable map data provided by the localization module 116 to calculate a lateral error value. The analysis module 118 is further configured to perform secondary calculations using the lateral error value, to determine whether the navigation system 106 is producing output that is within an acceptable, predefined error bound.

In the event that the analysis module 118 determines that the navigation system 106 is not operating within a predefined error bound, the output module 120 is configured to provide an error notification. In some embodiments, the error notification is an "error flag" that is set at the vehicle 100, which may initiate one or more reactions by vehicle systems. For example, the error flag may be communicated to the navigation system, which may issue a warning to a user that any provided navigation data may be inaccurate. As another example, the error flag may be communicated to an autonomous driving application, which may then deactivate, or go into degrade operation mode, due to poor performance of the navigation system.

In practice, the localization module 116, the analysis module 118, and the output module 120 may be implemented with (or cooperate with) the at least one processor 112 and the system memory 114 to perform at least some of the functions and operations described in more detail herein. In this regard, the localization module 116, the analysis module 118, and the output module 120, may be realized as suitably written processing logic, application program code, or the like.

Figure 2:
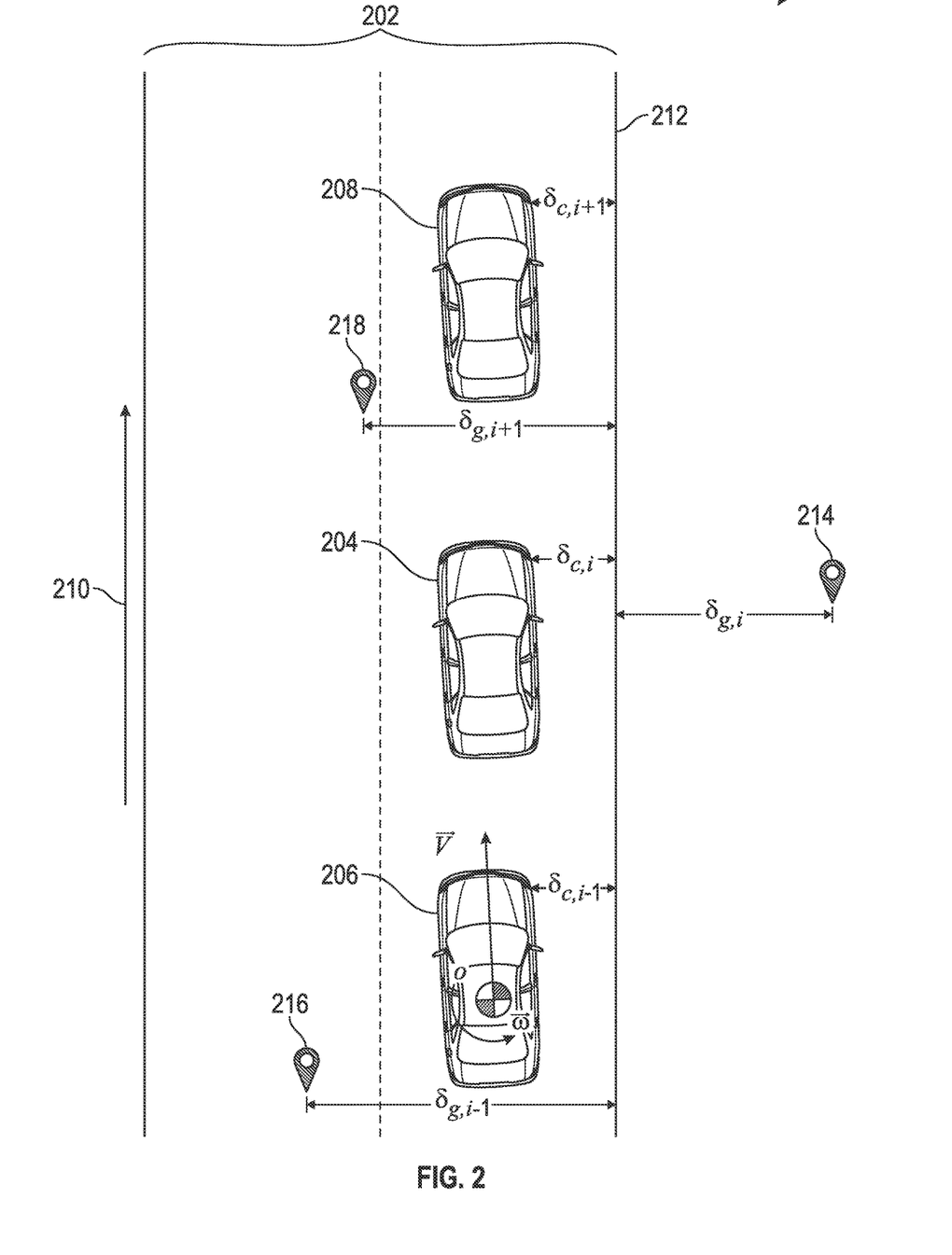
FIG. 2 is a diagram illustrating lateral offsets of a vehicle, in accordance with the disclosed embodiments.

FIG. 2 is a diagram 200 illustrating lateral offsets of a vehicle 204, in accordance with the disclosed embodiments. As shown, a vehicle 204 is traveling in a direction 210 on a road 202. The vehicle 204 is using one or more sensors (not shown) to identify a lateral offset ($\delta_{c,i}$). This lateral offset ($\delta_{c,i}$) is a distance value measured from the vehicle to a particular landmark. In this example, the applicable landmark is a lane marker 212, although any other detected landmark with associated data stored in a map database could be used by the vehicle 204. Lane marker 212 is the painted line on the road 202 used to delineate the right side edge of the road 202. The one or more vehicle sensors first detect the lane marker 212, and then the one or more vehicle sensors identify the distance to the lane marker 212. This distance is the sensor-based lateral offset ($\delta_{c,i}$). In this particular example, due to the use of a lane marker 212 as the landmark from which the sensor-based lateral offset ($\delta_{c,i}$) is determined, the lateral offset may also be referred to as a "lane offset".

The vehicle 204 is shown at a previous time instance as vehicle 206, and with a previously detected, sensor-based lateral offset ($\delta_{c,i-1}$). The vehicle 204 is also shown at a later time instance as vehicle 208, and with a later-detected, sensor-based lateral offset ($\delta_{c,i+1}$). Each of the previously-detected lateral offset ($\delta_{c,i-1}$) and the later-detected lateral offset ($\delta_{c,i+1}$) are generated in the same way as the current lateral offset ($\delta_{c,i}$); e.g., the one or more vehicle sensors detect the lane marker 212 and then identify the distance from the vehicle 204, 206, 208 to the lane marker 212.

The vehicle 204 also uses an onboard navigation system (not shown) and a vehicle-accessible map database to detect a second lateral offset ($\delta_{g,i}$). Here, the vehicle 204 uses the navigation system to obtain a triangulated vehicle position 214. The vehicle 204 also associates the detected landmark (e.g., the lane marker 212) to map data stored in a map database accessible to the vehicle 204. Association of the detected landmark may be referred to as "localization", and provides positional data for the lane marker 212, which may include, without limitation, latitude and longitude, x and y coordinates, a triangulated position, navigation data, and/or other geographic notations associated with the lane marker 212. Localization methods are well-known in the art, and will not be described in detail herein. Once the vehicle 204 has "localized" itself and obtained map data for the lane marker 212, the vehicle 204 is able to determine the second lateral offset ($\delta_{g,i}$) by comparing the map data for the lane marker 212 (which includes navigation data for the lane marker 212) to the navigation data for the vehicle 204.

The diagram 200 depicts the vehicle 204 at a previous time instance as vehicle 206, and with a previously determined lateral offset ($\delta_{g,i-1}$) using navigation system data and map database data. The vehicle 204 is also shown at a later time instance as vehicle 208, and with a later-detected lateral offset ($\delta_{g,i+1}$) using navigation system data and map database data. Each of the previously-detected lateral offset ($\delta_{g,i-1}$) and the later-detected lateral offset ($\delta_{g,i+1}$) are generated in the same way as the current lateral offset ($\delta_{g,i}$); e.g., the navigation system detects a triangulated vehicle position 214, 216, 218 at each time instance, and then the vehicle 204, 206, 208 identifies the distance from each navigation reading to the lane marker 212 using associated map data.

Figure 3:
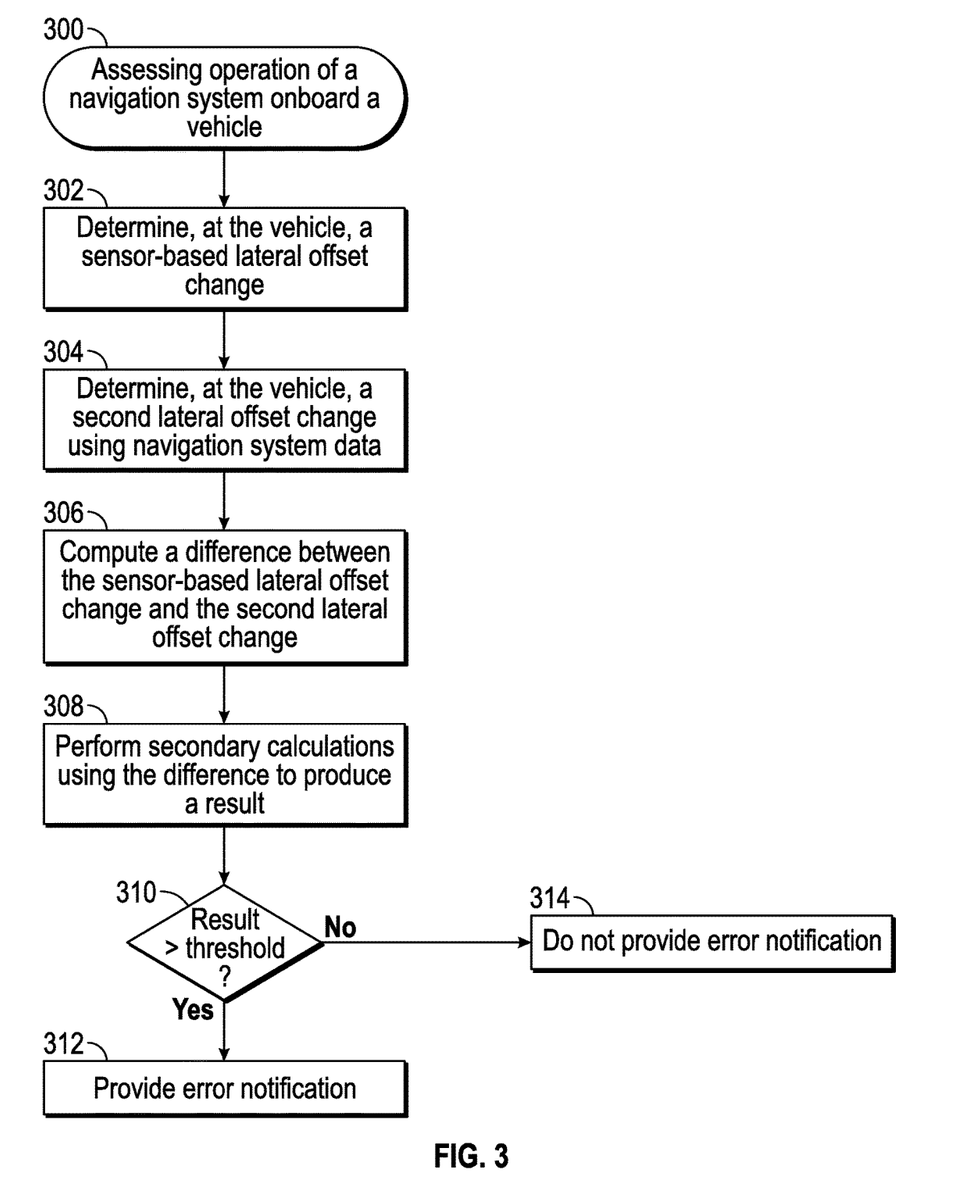
FIG. 3 is a flow chart that illustrates an embodiment of a process for assessing operation of a navigation system onboard a vehicle.

FIG. 3 is a flow chart that illustrates an embodiment of a process 300 for assessing operation of a navigation system onboard a vehicle. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system, e.g., a navigation system, vehicle sensors, a communication device, or a vehicle electronic control unit (ECU). It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 400 as long as the intended overall functionality remains intact.

For ease of description and clarity, it is assumed that the process 300 begins by determining, at the vehicle, a sensor-based lateral offset change (step 302). One suitable methodology for determining the sensor-based lateral offset change is described below with reference to FIG. 4. Here, the process 300 detects a plurality of sensor-based lateral offset readings, and determines a difference between them. In certain embodiments, the process 300 may use two lateral offset values and obtain a difference between them. In some embodiments, the process 300 may use more than two lateral offset values, obtain differences between each subsequent reading, and then obtain an average of each of the plurality of difference values. An exemplary embodiment of a sensor-based lateral offset change may be represented by the notation used in the description of FIG. 2: $\delta_{c,i}-\delta_{c,i-1}$. Here, the sensor-based lateral offset change is calculated by subtracting a detected lateral offset value from an earlier obtained lateral offset value.

The process 300 then determines, at the vehicle, a second lateral offset change using navigation system data (step 304). One suitable methodology for determining the second lateral offset change using navigation system data is described below with reference to FIG. 5. Here, the process 300 uses data that is separate and distinct from the previously used sensor data to determine a plurality of lateral offset values. Just as in step 302, the lateral offset change may be a difference between two lateral offset values, or the lateral offset change may be an average of more than difference. An exemplary embodiment of a lateral offset change (determined using navigation system data and map data) may be represented by the notation used in the description of FIG. 2: $\delta_{g,i}-\delta_{g,i-1}$. Here, the second lateral offset change is calculated by subtracting a determined lateral offset value from an earlier-determined lateral offset value.

Next, the process 300 computes a difference between the sensor-based lateral offset change and the second lateral offset change (step 306). An exemplary embodiment of this calculation may be represented using some of the notations used in the description of FIG. 2: $x_i=(\delta_{g,i}-\delta_{g,i-1})-(\delta_{c,i}-\delta_{c,i-1})$. In this example, $x_i$ is the difference value and is representative of a calculated error associated with the data supplied by the navigation system. Due to inherent inaccuracies in the data supplied by the navigation system, some amount of error is expected. By comparing the lateral offset change using sensors onboard the vehicle with the lateral offset change determined using navigation system readings, the process 300 is able to determine the amount of error in the navigation system readings.

After computing the difference (step 306), the process 300 performs secondary calculations using the difference, to produce a result (step 308). The difference obtained in step 306 is a calculated error for the lateral offset change obtained by a sensor and a lateral offset change obtained using the navigation system. The assumption is made here that the sensor is more accurate than the navigation system, and thus, the error is associated with the navigation system. In certain embodiments, the process 300 performs secondary calculations to calculate a mean for the difference, or in other words, a mean for the calculated error. In some embodiments, the process 300 uses secondary calculations to calculate a variance for the difference. Here, the mean, variance, and any other values obtained through secondary calculations may be used in an effort to eliminate signal "noise" or other unfavorable factors. Additionally, the process 300 may use any calculation or statistical measure to produce the result, which is compared to a threshold value. The threshold value is generally obtained at design time, through calibration and testing efforts to determine the greatest acceptable amount of error.

When the calculated result (e.g., the mean, variance, or other calculated value associated with the error value) is not greater than a threshold value (the "No" branch of 310), the process 300 does not take any action (step 314), and the vehicle continues operations normally. However, when the calculated result is greater than a threshold value (the "Yes" branch of 310), the process 300 provides an error notification (step 312). The error notification may include an error flag for internal vehicle systems, which may trigger additional action in the vehicle. Such action may include presenting an alert, issuing a warning through the navigation system of potentially inaccurate readings, or deactivating an autonomous driving application onboard the vehicle.

Figure 4:
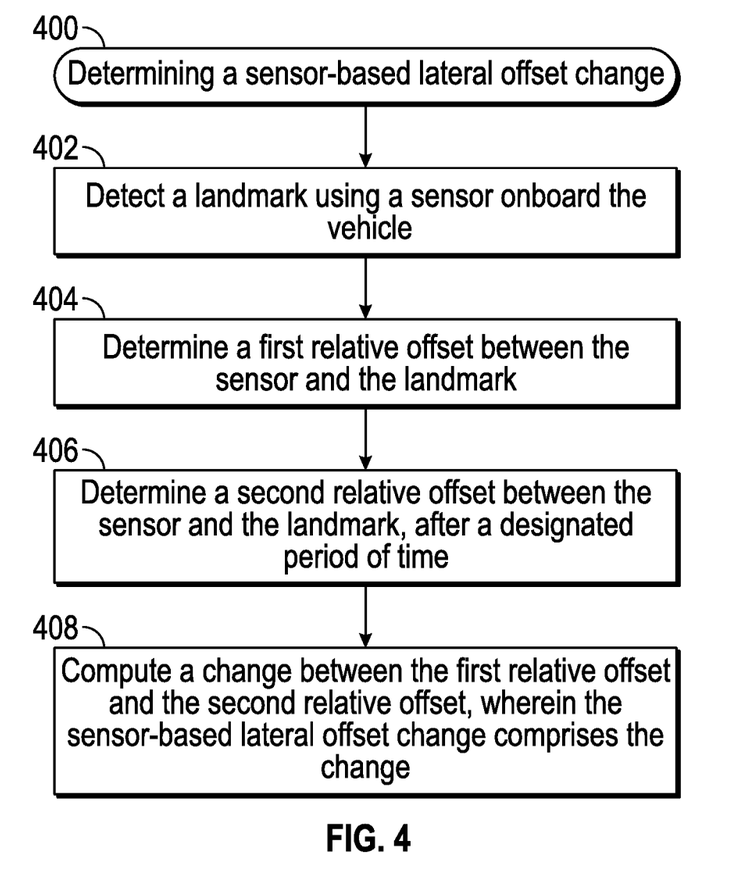
FIG. 4 is a flow chart that illustrates an embodiment of a process for determining a sensor-based lateral offset change.

FIG. 4 is a flow chart that illustrates an embodiment of a process 400 for determining a sensor-based lateral offset change. It should be appreciated that the process 400 described in FIG. 4 represents one embodiment of step 302 described above in the discussion of FIG. 3, including additional detail. First, the process 400 detects a landmark using a sensor onboard the vehicle (step 402). The sensor onboard the vehicle may be any sensor capable of detecting physical features of the surrounding area of the vehicle. The sensor may be a camera system mounted on the vehicle, a lidar sensor, a radar sensor, or the like. A landmark may be anything within detection distance of the sensor which is also associated with map data stored in a database accessible to the vehicle. Examples of landmarks may include, road-based features, such as: lane markers (e.g., stripes or dashed lines painted on the road surface, reflectors on the road surface, etc.), road signs, barricades, railing, or the like. Landmarks may also include land-based features, such as: a tree, a mountain, or the like.

Next, the process 400 determines a first relative offset between the sensor and the landmark (step 404). Here, the sensor provides the distance it has obtained through standard operation. Since the sensor is onboard the vehicle, the offset between the sensor and the landmark is effectively an offset between the vehicle and the landmark.

The process 400 then determines a second relative offset between the sensor and the landmark, after a designated period of time (step 406). The methodology for obtaining the second relative offset is the same as that used to obtain the first relative offset: the process 400 obtains the distance from the sensor to the landmark from the sensor. The designated period of time is the amount of time between each sensor reading. In certain embodiments, the same period of time is used as a regular interval between sensor readings. In some embodiments, the designated period of time may vary, and include different intervals for different instances of a sensor reading.

After obtaining first and second relative offsets (steps 404, 406), the process 400 computes a change between the first relative offset and the second relative offset, to produce a sensor-based lateral offset change (step 408). The sensor-based lateral offset change represents the difference in the distance from a vehicle to a landmark, at two separate time instances, while the vehicle is traveling. This sensor-based lateral offset change is used at the vehicle for further processing to assess the performance of a navigation system onboard the vehicle.

Figure 5:
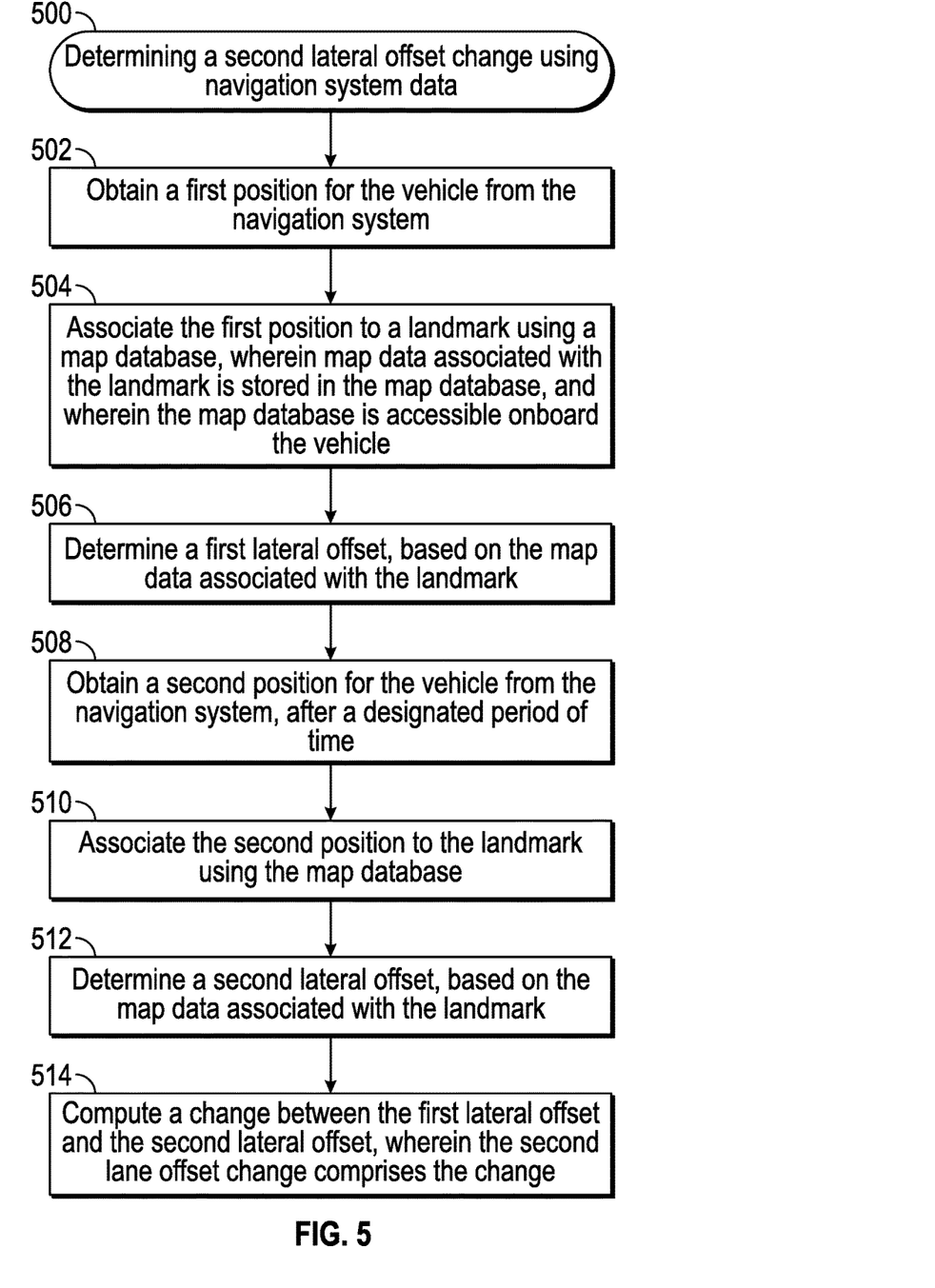
FIG. 5 is a flow chart that illustrates an embodiment of a process for determining a lateral offset change using navigation system data.

FIG. 5 is a flow chart that illustrates an embodiment of a process 500 for determining a lateral offset change using navigation system data. It should be appreciated that the process 500 described in FIG. 5 represents one embodiment of step 304 described above in the discussion of FIG. 3, including additional detail. First, the process 500 obtains a first position for a vehicle from an onboard navigation system (step 502). The position is a triangulated position for the vehicle, and may be provided by a global positioning system (GPS) or other navigation equipment onboard the vehicle.

The process 500 then associates the first position to a landmark using a map database, wherein map data associated with the landmark with the landmark is stored in the map database, and wherein the map database is accessible onboard the vehicle (step 504). The landmark is a physical feature of the land or road, outside the vehicle, that has been previously identified by the vehicle to determine a sensor-based lateral offset change, as described previously with regard to FIGS. 3 and 4. The process 500 associates the first position (i.e., the vehicle position provided by the navigation system) to the landmark for purposes of consistency in comparing the lateral offset values between those obtained by the sensor and those determined using a navigation system and map data. This association of the vehicle position to the landmark using map data may be referred to as "localization". Localization provides the process 500 with appropriate map data indicating location for the landmark, for purposes of calculating lateral offset values (e.g., distance between the vehicle and the landmark at different times).

The process 500 then determines a first lateral offset, based on the map data associated with the landmark (step 506). Here, the map data provides a location for the landmark, in the same vicinity as the vehicle, and the navigation system has provided a location for the vehicle. The process 500 uses the two provided locations to calculate the first lateral offset. Location data for the vehicle and the landmark may include latitude and longitude, x and y coordinates, a triangulated position, navigation data, and/or other appropriate geographic notations common to the navigation system and map database.

Next, the process 500 obtains a second position for the vehicle from the navigation system after a designated period of time (step 508), and associates the second position to the landmark using the map database (step 510). The process 500 then determines a second lateral offset, based on the map data associated with the landmark (step 512). The methodology for obtaining the second vehicle position is the same as that for obtaining the first vehicle position, and the methodology for determining the second lateral offset is the same as that for determining the first lateral offset. The designated period of time is the amount of time between each instance of obtaining navigation system data and performing the localization process. In certain embodiments, the same period of time is used as a regular interval, and in some embodiments, the designated period of time may vary.

The process 500 then computes a change between the first lateral offset and the second lateral offset, wherein the second lateral offset change comprises the change (step 514). The lateral offset change determined using map data and navigation system data represents the difference in the distance from a vehicle to a landmark, at two separate time instances, while the vehicle is traveling. This lateral offset change is used at the vehicle, in combination with a sensor-based lateral offset change, for further processing to assess the performance of the navigation system onboard the vehicle.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for assessing operation of a navigation system onboard a vehicle, the method comprising:
   determining a sensor-based lateral offset change using vehicle onboard sensor data;
   determining a second lateral offset change using navigation system data;
   computing a difference between the sensor-based lateral offset change and the second lateral offset change;
   performing secondary calculations using the difference to produce a result; and
   when the result is greater than a threshold error value, providing an error notification;
   wherein determining the sensor-based lateral offset change further comprises:
   detecting a lane marker using a sensor onboard the vehicle;
   determining a first relative offset between the sensor and the lane marker, the vehicle onboard sensor data comprising the first relative offset;
   determining a second relative offset between the sensor and the lane marker, after a designated period of time, the vehicle onboard sensor data comprising the second relative offset; and
   computing a change between the first relative offset and the second relative offset, wherein the sensor-based lateral offset change comprises the change.

2. The method of claim 1, wherein determining the second lateral offset change using navigation system data further comprises:
   obtaining a first position for the vehicle from the navigation system, the navigation system data comprising the first position;
   associating the first position to a lane marker using a map database, wherein map data associated with the lane marker is stored in the map database, and wherein the map database is accessible onboard the vehicle;
   determining a first lateral offset, based on the map data associated with the lane marker;
   obtaining a second position for the vehicle from the navigation system, after a designated period of time, the navigation system data comprising the second position;
   associating the second position to the lane marker using the map database;
   determining a second lateral offset, based on the map data associated with the landmark; and
   computing a change between the first lateral offset and the second lateral offset, wherein the second lateral offset change comprises the change.

3. The method of claim 1, wherein performing the secondary calculations comprises calculating a mean value of the difference, the result comprising the mean value; and
   wherein, when the result is greater than an allowable mean value, the operation of the navigation system is outside of acceptable error limits, the threshold error value comprising the allowable mean value.

4. The method of claim 1, wherein performing the secondary calculations comprises calculating a variance value of the difference, the result comprising the variance value; and
   wherein, when the result is greater than an allowable variance value, the operation of the navigation system is outside of acceptable error limits, the threshold error value comprising the allowable variance value.

5. The method of claim 1, wherein, when the result is greater than the threshold error value, the method further comprises deactivating an autonomous driving application onboard the vehicle.

6. A system for assessing operation of a navigation system onboard a vehicle, the system comprising:

system memory;
a navigation system, configured to detect a plurality of vehicle positions;
at least one vehicle sensor, configured to obtain first lateral offset data associating the vehicle to a lane marker; and
at least one processor, communicatively coupled to the system memory, the navigation system, and the at least one vehicle sensor, the at least one processor configured to execute processing logic configured to:
compute second lateral offset data based on the plurality of vehicle positions detected by the navigation system;
calculate a difference between the first lateral offset data and the second lateral offset data; and
determine whether the navigation system is operating within allowable error limits, based on the difference.

7. The system of claim 6, wherein the at least one vehicle sensor is further configured to:
detect a landmark;
determine a first relative offset between the at least one vehicle sensor and the landmark;
determine a second relative offset between the at least one vehicle sensor and the landmark, after a designated period of time; and
compute a change between the first relative offset and the second relative offset, wherein the first lateral offset data comprises the change.

8. The system of claim 6, wherein the processing logic is further configured to:
obtain a first position for the vehicle from the navigation system, the plurality of vehicle positions comprising the first position;
associating the first position to a landmark using a map database, wherein map data associated with the landmark is located in the map database, and wherein the map database is accessible onboard the vehicle;
determining a first lateral offset, based on the map data associated with the landmark;
obtaining a second position for the vehicle from the navigation system, after a designated period of time, the plurality of vehicle positions comprising the second position;
associating the second position to the landmark using the map database;
determining a second lateral offset, based on the map data associated with the landmark; and
computing a change between the first lateral offset and the second lateral offset, wherein the second lateral offset data comprises the change.

9. The system of claim 8, further comprising:
a communication device, configured to access the map database via a wireless communication connection at the vehicle.

10. The system of claim 8, wherein the system memory is configured to store the map database; and
wherein the processing logic is further configured to access the map database to compute the second lateral offset data.

11. The system of claim 6, wherein the at least one vehicle sensor comprises a camera system onboard the vehicle.

12. The system of claim 6, wherein the at least one vehicle sensor comprises one or more lidar sensors onboard the vehicle.

13. The system of claim 6, wherein the at least one vehicle sensor comprises one or more radar sensors onboard the vehicle.

14. A non-transitory, computer-readable medium containing instructions thereon, which, when executed by a processor, perform a method comprising:
calculating a difference between a first lateral vehicle offset to a second lateral vehicle offset, wherein the first lateral vehicle offset is provided by a vehicle sensor, and wherein the second lateral vehicle offset is based on data obtained from a navigation system onboard a vehicle, by:
obtaining a first position for the vehicle from the navigation system;
associating the first position to a landmark using a map database, wherein map data associated with the landmark is located in the map database, and wherein the map database is accessible onboard the vehicle;
determining a first lateral offset, based on the map data associated with the landmark;
obtaining a second position for the vehicle from the navigation system, after a designated period of time;
associating the second position to the landmark using the map database;
determining a second lateral offset, based on the map data associated with the landmark; and
computing a change between the first lateral offset and the second lateral offset, wherein the second lateral vehicle offset comprises the change; and
determining whether the navigation system is functioning within a predefined error bound, based on the difference.

15. The non-transitory, computer-readable medium of claim 14, wherein the method further comprises:
detecting a landmark using a sensor onboard the vehicle;
determining a first relative offset between the sensor and the landmark;
determining a second relative offset between the sensor and the landmark, after a designated period of time; and
computing a change between the first relative offset and the second relative offset, wherein the first lateral vehicle offset comprises the change.

16. The non-transitory, computer-readable medium of claim 14, wherein the method further comprises:
performing secondary calculations using the difference to produce a result; and
when the result is greater than a threshold error value, determining that the navigation system is not functioning within the predefined error bound.

17. The non-transitory, computer-readable medium of claim 14, wherein the method further comprises:
performing secondary calculations using the difference to produce a result; and
when the result is greater than a threshold error value, providing an error notification in the vehicle.

18. The non-transitory, computer-readable medium of claim 14, wherein the method further comprises:
performing secondary calculations using the difference to produce a result; and
when the result is greater than a threshold error value, deactivating an autonomous driving application of the vehicle.

* * * * *